United States Patent
Edwards

(10) Patent No.: US 7,441,784 B2
(45) Date of Patent: Oct. 28, 2008

(54) LUGGAGE CASE WITH REMOVABLE LARGE WHEELS

(76) Inventor: Anthony Edwards, 13700 Tahiti Way, No. 153, Marina Del Rey, CA (US) 90292

( * ) Notice: Subject to any disclaimer, the term of this patent is extended or adjusted under 35 U.S.C. 154(b) by 88 days.

(21) Appl. No.: 10/916,705

(22) Filed: Aug. 12, 2004

(65) Prior Publication Data

US 2005/0017467 A1    Jan. 27, 2005

Related U.S. Application Data

(63) Continuation-in-part of application No. 10/059,793, filed on Jan. 29, 2002, now Pat. No. 6,877,752.

(51) Int. Cl.
*B62B 1/20* (2006.01)
(52) U.S. Cl. .................. 280/47.26; 190/18 A
(58) Field of Classification Search ............. 280/47.17, 280/47.2, 47.24, 47.26, 37, 652, DIG. 6; 190/18 A; 301/121, 128
See application file for complete search history.

(56) References Cited

U.S. PATENT DOCUMENTS

| | | | |
|---|---|---|---|
| 2,493,824 A | | 1/1950 | Noros |
| 2,551,009 A | * | 5/1951 | Kaltenbach ............ 280/47.19 |
| 2,919,138 A | | 12/1959 | Brower |
| 3,087,740 A | | 4/1963 | Mitty |
| 3,258,275 A | | 6/1966 | Schaefer et al. |
| 3,334,910 A | * | 8/1967 | Wilson et al. ............ 280/35 |
| 3,782,751 A | * | 1/1974 | Williams ............... 280/87.01 |
| 3,889,966 A | | 6/1975 | Zeitlin |
| 3,989,128 A | | 11/1976 | Walker |
| 3,997,038 A | | 12/1976 | Walker |
| 4,076,319 A | | 2/1978 | Walker |
| 4,354,583 A | | 10/1982 | Walker |
| 4,576,389 A | * | 3/1986 | Villaveces et al. ....... 280/43.16 |
| 4,758,009 A | | 7/1988 | Abel |
| 4,900,043 A | | 2/1990 | Kho |
| 5,456,342 A | | 10/1995 | Rekuc et al. |
| 5,575,391 A | | 11/1996 | Gerch |
| 5,676,286 A | | 10/1997 | Song |
| 5,749,503 A | | 5/1998 | Wulf et al. |
| 5,944,155 A | | 8/1999 | Geary |
| 5,984,154 A | | 11/1999 | Scicluna |

(Continued)

FOREIGN PATENT DOCUMENTS

DE    4042175    7/1992

(Continued)

*Primary Examiner*—Frank B Vanaman

(57) ABSTRACT

Removable large wheels for a luggage case, having two permanent sleeves inserted in holes drilled in the pre-existing small wheel mounting blocks which contain the pre-existing small wheels. Two axles, one in each of the sleeves, with a permanent stop at the inner end of each axle and a spring loaded button at the outer end of each axle. The large wheels have an extended tubular part at the hub on the inner side of each wheel which prevents the wheel from touching the outer edge of the luggage when installed. The axle can be extended outward to accept the large wheel, which is maintained on the axle by a spring loaded button. When not in use, the axle can be retracted back into the sleeve. When retracted the axles are prevented from moving in either direction by the pressure of the spring loaded buttons against the inner wall of the sleeves.

3 Claims, 3 Drawing Sheets

U.S. PATENT DOCUMENTS

| | | |
|---|---|---|
| 5,997,105 A * | 12/1999 | Wu .......................... 301/124.1 |
| 6,253,892 B1 | 7/2001 | Edwards |
| 6,550,651 B1 * | 4/2003 | Murdoch et al. ............ 224/153 |
| 6,561,327 B1 | 5/2003 | Godshaw |
| 6,682,152 B2 * | 1/2004 | Melgarejo et al. ...... 301/111.06 |
| 2003/0042711 A1 | 3/2003 | Hsu |
| 2003/0141684 A1 | 7/2003 | Edwards |

FOREIGN PATENT DOCUMENTS

| | | |
|---|---|---|
| GB | 1539021 | 1/1979 |
| GB | 2276148 | 9/1994 |

\* cited by examiner

LUGGAGE CASE WITH REMOVABLE LARGE WHEELS

This application is a continuation-in-part of prior copending U.S. patent application Ser. No. 10/059,793, filed Jan. 29, 2002 now U.S. Pat. No. 6,877,752, the benefit of which is claimed.

BACKGROUND OF THE INVENTION

1. Field of the Invention

The present invention relates to luggage, more particularly to wheeled luggage, and especially to luggage having large wheels.

2. Description of the Related Art

At the present time, carry-on luggage for travel by aircraft is usually provided with wheels to aid in their transport and improve mobility. Such wheels are restricted in size to allow maximum size for the luggage itself which is limited in extent by the airlines. For example, United Airlines restricts carry-on luggage to 22 by 14 by 9 inches. American Airlines restricts carry-on luggage to 23 by 13 by 9 inches. British Airways restricts carry-on luggage to 22 by 16 by 8 inches.

Even larger luggage which must be checked is generally provided with relatively small wheels.

Accordingly, there is a need for means providing luggage with larger wheels for greater ease in transport but which can be removed when no longer necessary.

Applicant is unaware of any prior art providing for a removable large wheel which can be added to small wheeled carry-on luggage or larger luggage which must be checked and then removed just before boarding aircraft or just before checking larger luggage.

SUMMARY OF THE INVENTION

An object of the invention is to provide large wheels which can be added to or removed from a luggage case having small wheels so that the luggage case can be more easily transported and rendered more mobile.

Another object of the invention is to provide large removable wheels which, after being removed from luggage having small wheels, can be stored either inside the luggage or in outside pockets attached to the luggage case.

The present invention provides two large wheels, two sleeves to be inserted through holes in the small wheel mounting blocks, and two small axles inserted in those sleeves, with a spring loaded button at the outer end of each axle and a stop affixed to the inner end of each axle to maintain the wheels in place when installed on the axles.

The small wheel mounting blocks of the carry-on luggage case are drilled with appropriate size holes to accept the sleeves which support the axles which hold the large wheels. Each axle has a spring loaded button at the outer end and a stop on the inner end to hold the large wheel in place when the wheel is installed. Each axle is long enough to accept the large wheel when extended. Each axle is prevented from leaving the sleeve by the stop on the inner end of the axle.

The large wheels are installed by depressing the spring loaded button and sliding the wheels onto the axles and over the spring loaded button. When released, the spring loaded button again protrudes and the wheels are held in position between the spring loaded button and the outer side of the small wheel mounting block.

The large wheels are removed by depressing the spring loaded buttons and sliding the wheels over the spring loaded buttons and off the axles. The axles are then refracted back into the sleeves by depressing the spring loaded buttons and manually retracting the axles into the sleeves, whereupon the spring loaded button, being biased to protrude from the axle, presses against the inner wall of the sleeve when the axle is in the retracted position within the sleeve. Until the axles are manually extended, the axles are prevented from moving in either direction by the pressure of the spring loaded buttons against the inner wall of the sleeves.

BRIEF DESCRIPTION OF THE DRAWINGS

For a further understanding of the objects and advantages of the present invention, reference should be had to the following detailed description, taken in conjunction with the accompanying drawing, in which like parts are given like reference numbers and wherein.

DESCRIPTION OF THE PREFERRED EMBODIMENTS

Figure 1:
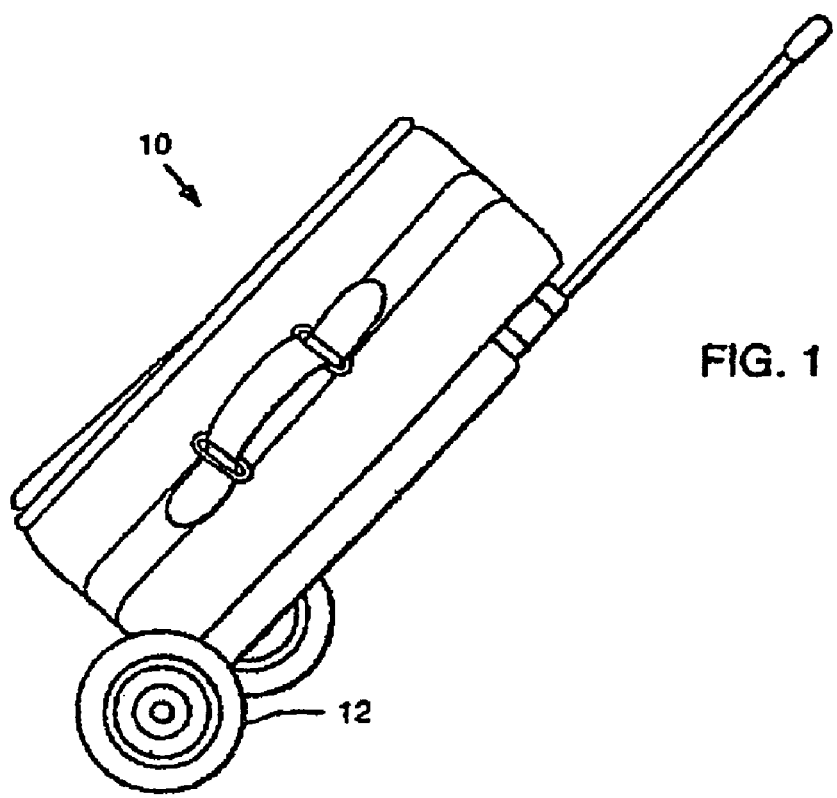
FIG. 1 is a perspective view of an embodiment of the invention showing a carry-on luggage case with a large wheel installed.
Figure 2:
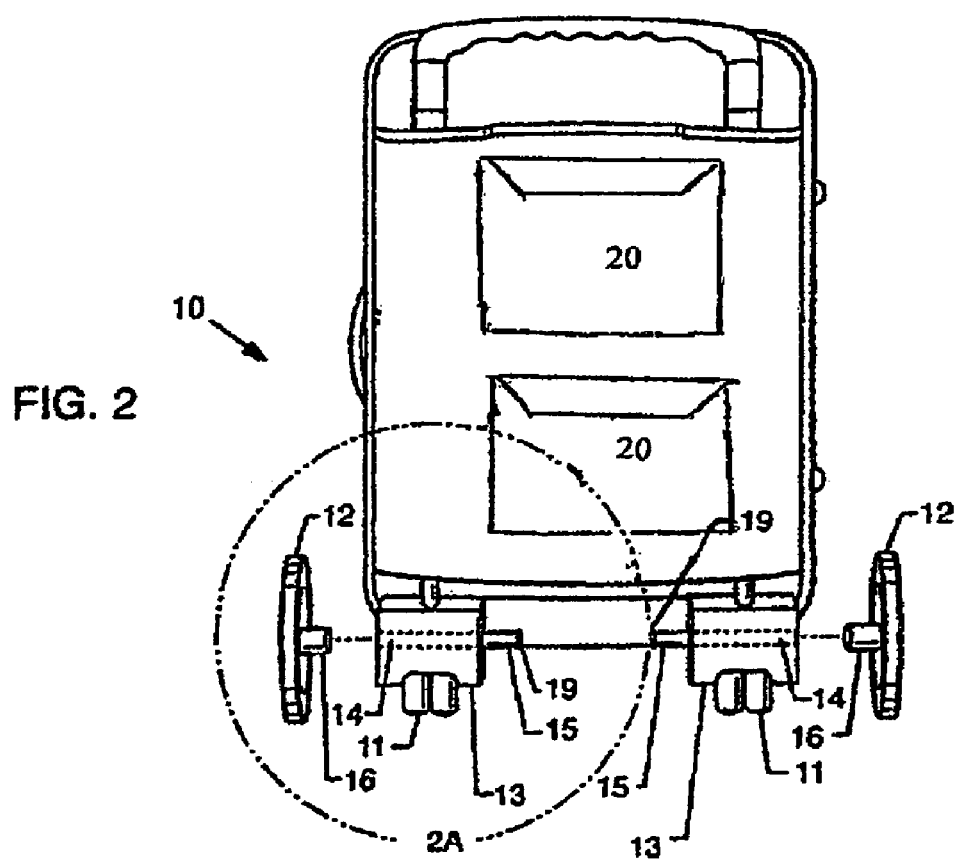
FIG. 2 is an exploded rear elevational view of the large wheels ready to be installed on the luggage case.

As shown in the drawings, a preferred embodiment of the invention has a carry-on luggage case 10 (FIG. 1) with removable large wheels in place. Luggage case 10 (FIGS. 2, 3 and 4) has a pouch or pockets 20 attached to the exterior side thereof to receive the two large wheels 12 when they are uninstalled.

The luggage case 10 is provided with small wheels 11 contained in the mounting blocks 13. Holes are drilled in the mounting blocks 13 to permanently contain the sleeves 14 which support the axles 15. The sleeves 14 which support the axles 15 are concealed horizontally within the small wheel mounting blocks 13 and are not visible but are indicated by dotted lines at 14 in FIGS. 2, 3, and 4.

The sleeves 14 hold the axles 15. The axles 15 hold the large wheels 12. The large wheels 12 are formed with inward-projecting tubular extensions 16 on the inner side of the large wheels 12 which prevent the large wheels 12 from contacting the outer sides of the luggage case when installed.

Spring loaded buttons 17 at the ends of axles 15 keep the large wheels 12 from falling off of the axles 15. The large wheels 12 may be held in place by many kinds of fasteners, such as a pin inserted through a hole in the outer end of the axle 15.

The large wheels 12 may remain mounted on the axles 15 at all times, but if it becomes necessary to remove the large wheels 12 they are easily uninstalled by depressing spring loaded buttons 17, removing the large wheels 12 by sliding them over the buttons 17, again depressing spring loaded buttons 17, and manually retracting the axles 15 back into the sleeves 14, whereupon the spring loaded buttons 17, being biased to protrude from the axles 15, press against the inner walls of the sleeves 14 when the axles 15 are in the retracted position within the sleeves 14. Until the axles are manually extended, the axles are prevented leaving the sleeves 14 in either direction by the pressure of spring loaded buttons 17 against the inner wall of sleeves 14.

Figure 2A:
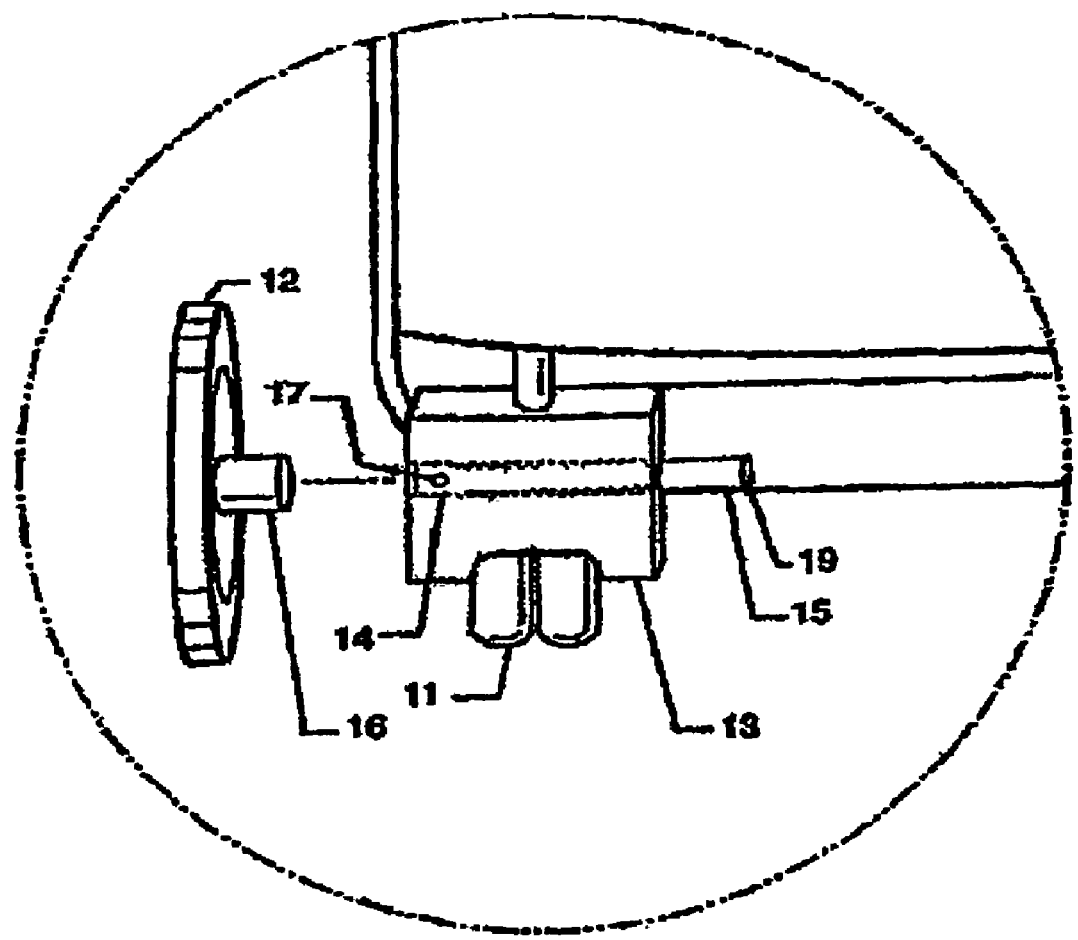
FIG. 2A is an enlargement of a portion of the view of FIG. 2 showing the axle retracted into the sleeve with the spring loaded button depressed into the axle.

The axles 15 are further prevented from slipping all the way out of the sleeves 14 beyond the extended position by stops 19 (seen in FIGS. 2A and 2) which are permanently affixed to the inner ends of axles 15 and are of the same diameter as sleeves 14.

Figure 3:
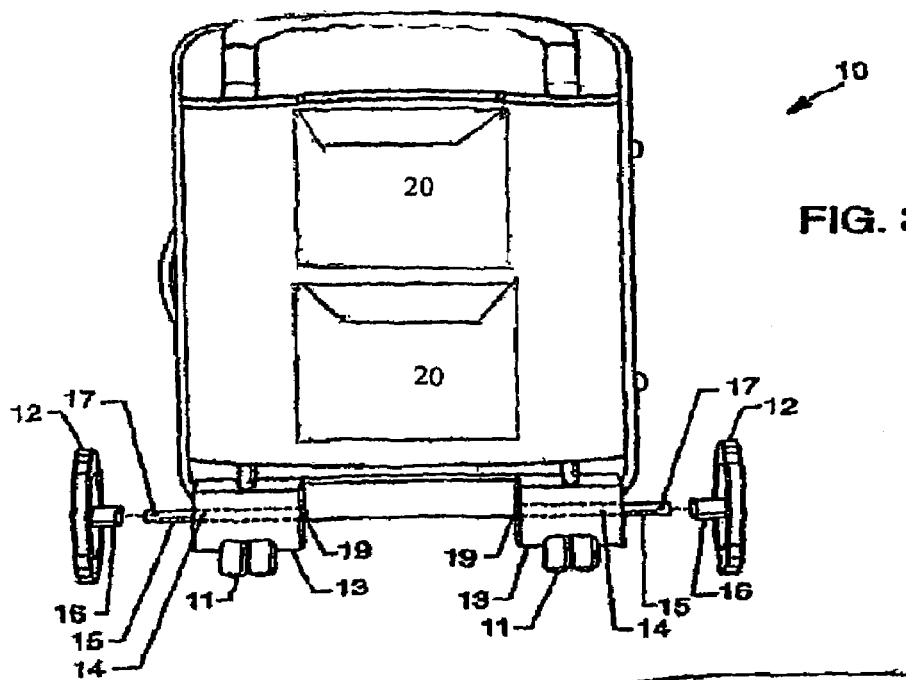
FIG. 3 is a rear elevational view of an embodiment of the invention showing a carry-on luggage case with a large wheel in exploded view showing the axles extended and ready for installation of the wheels with the spring loaded button protruding from the axle.
Figure 4:
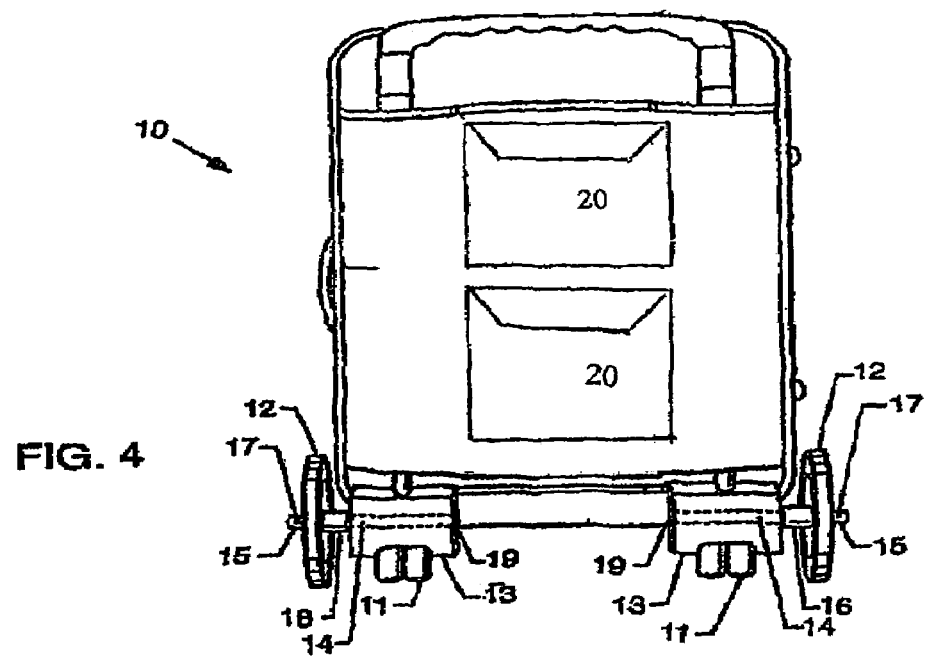
FIG. 4 is a rear elevational view of an embodiment of the invention showing a carry-on luggage case with the large wheels installed.

FIG. 3 shows luggage case 10 with axles 15 extended ready for installation of large wheels 12. Large wheels 12 are installed. Spring loaded buttons 17 maintain the large wheels 12 on the axles 15 between the spring loaded buttons 17 and the outer side of mounting blocks 13.

The large wheels 12 are installed by manually extending axles 15 out of the sleeves 14, depressing spring loaded buttons 17 and sliding the large wheels 12 over the spring loaded buttons 17 which again protrude from the axles 15 and maintain the large wheels 12 on the axles 15 in a position between the spring loaded buttons 17 and the outer side of the mounting blocks 13.

To uninstall the large wheels 12, spring loaded buttons 17 are depressed, the large wheels 12 are slipped over the spring loaded buttons 17 and off the axles 15. The spring loaded buttons 17 are again depressed and the axles manually retracted back into the sleeves 14 where they are prevented from leaving the sleeves 14 in either direction by the pressure of spring loaded buttons 17 against the inner wall of sleeves 14.

Large wheels 12 may be made of any suitable material such as ABS plastic or nylon or metal with a co-injected rubber tread portion.

The terms "fastener" and "fasteners" have been replaced by the terms "spring loaded button" and "spring loaded buttons" wherever they appear in application Ser. No. 10/059,793. With the substitution of this method of attaching removable large wheels to luggage with small wheels the fastener "18" and the stop "23" have become unnecessary and have been deleted from the text and drawings in this continuation-in-part.

Although I have described the invention in detail with reference to the accompanying drawings illustrating a preferred embodiment of the invention, it is understood that numerous changes may be made in the details of construction and arrangement of parts without departing from the spirit and scope of the invention as hereinafter claimed.

What is claimed is:

1. Luggage with removable large wheels comprising:
a luggage case having a bottom and sides;
a pair of mounting blocks at the bottom of said luggage case;
each of said mounting blocks containing a horizontal sleeve;
each of said sleeves having a movable axle therein;
each of said axles having a retracted position and an extended position in said sleeve;
a pair of wheels each having a tubular extension at the hub to prevent the wheels from contacting the sides of the luggage case when installed, and a spring loaded button at the outer end of each axle to maintain the wheel on the axle when installed;
said spring loaded button being biased to protrude from said axle, said spring loaded button being depressible to allow said wheel to slide over said spring loaded button onto said axle and when released to again protrude from said axle to retain said wheel on said axle;
wherein said spring loaded button is depressible to allow said axle to slide into said sleeve when said wheel is removed, said spring loaded button being biased to protrude from said axle and press against the inner wall of said sleeve maintaining said axle in the retracted position within said sleeve.

2. Luggage with removable large wheels as set forth in claim 1, comprising a stop affixed to the inner end of said axle, said stop preventing said axle from exiting said sleeve beyond the extended position.

3. Luggage with removable large wheels as set forth in claim 1, comprising an outside pocket for storage of said large wheels.

* * * * *